United States Patent [19]

Güdesen

[11] Patent Number: 4,558,439
[45] Date of Patent: Dec. 10, 1985

[54] PASSIVE METHOD FOR OBTAINING TARGET DATA FROM A SOUND SOURCE

[75] Inventor: Alwin Güdesen, Morsum, Fed. Rep. of Germany

[73] Assignee: Fried. Krupp Gesellschaft mit beschränkter Haftung, Essen, Fed. Rep. of Germany

[21] Appl. No.: 465,638

[22] Filed: Feb. 10, 1983

[30] Foreign Application Priority Data

Feb. 11, 1982 [DE] Fed. Rep. of Germany ....... 3204874

[51] Int. Cl.$^4$ .......................... G01S 11/00; G01S 5/18
[52] U.S. Cl. ..................................... 367/127; 367/136
[58] Field of Search ............... 367/118, 125, 127, 135, 367/136

[56] References Cited

U.S. PATENT DOCUMENTS

| | | | |
|---|---|---|---|
| 1,341,795 | 6/1920 | Fessenden | 367/127 |
| 2,398,432 | 4/1946 | Livermore | 367/127 |
| 3,182,283 | 5/1965 | Ellingson et al. | 367/135 |
| 3,895,344 | 7/1975 | Gill, Jr. et al. | 367/136 |
| 4,001,771 | 1/1977 | Amrine et al. | 367/127 |
| 4,122,432 | 10/1978 | Triebold et al. | 367/135 |
| 4,158,832 | 6/1979 | Barnes, Jr. et al. | 367/136 |
| 4,271,412 | 6/1981 | Glass et al. | 343/5 FT |

FOREIGN PATENT DOCUMENTS 2062864 5/1981 United Kingdom .

*Primary Examiner*—Richard A. Farley
*Attorney, Agent, or Firm*—Spencer & Frank

[57] ABSTRACT

A passive method for obtaining target data from a sound source disposed in a nonsolid medium by means of a sound receiver remote from the sound source, by the steps of: providing, as the sound receiver, first and second sound-to-electrical signal transducers constituted and positioned to each respond to a respective one of two sound waves propagated from the sound source to the sound receiver at respectively different propagation speeds; and deriving, by means of an electrical signal processing system connected to receive output signals from the transducers, target data from the sound source by determining the frequencies of, or the difference in reception time between, the sound waves emitted by the source and to which the two transducers respond.

10 Claims, 8 Drawing Figures

PASSIVE METHOD FOR OBTAINING TARGET DATA FROM A SOUND SOURCE

BACKGROUND OF THE INVENTION

The present invention relates to a passive method for obtaining target data from a sound source, preferably one which is moving, disposed in a nonsolid, or fluid medium, such as air or water, with the aid of a sound receiver which is remote from the sound source.

Target data are here understood to be parameters which indicate the state of the sound source, e.g. its distance, speed and possibly its position and/or type, e.g. the frequency spectrum radiated by the sound source.

SUMMARY OF THE INVENTION

It is an object of the present invention to provide such a method which is suitable to obtain, at relatively low cost, parameters of stationary and/or moving or flying sound sources with sufficient reliability and reproducibility and which can be employed with an automatically operating system. The low cost of implementing the method is due to the requirements for quality and sensitivity of the sound receiver as well as the extent of preliminary work required to install the system in areas being monitored.

The above and other objects are achieved, according to the invention, by a passive method for obtaining target data from a sound source disposed in a nonsolid medium by means of a sound receiver remote from the second source, comprising: providing, as the sound receiver, first and second sound-to-electrical signal transducers constituted and positioned to each respond to a respective one of two sound waves propagated from the sound source to the sound receiver at respectively different propagation speeds; and deriving, by means of an electrical signal processing system connected to receive output signals from the transducers, target data from the sound source by determining the frequencies of, or the difference in reception time between the sound waves emitted by the source and to which the two transducers respond.

The method according to the invention utilizes the fact that the sound energy radiated by a sound source is transmitted at different propagation speeds on its path from the sound source to the location of the sound receiver, or measuring station, either through various strata of a medium, each stratum having a respectively different transmission characteristic, or through different media having respectively different transmission characteristics, or through a medium in which different types of sound waves have different forms, such as, for example, longitudinal, transversal or Rayleigh waves in solid media. In this way, different measured data are obtained from the same sound source over at least two different transmission channels and target data can be derived therefrom according to simple mathematical rules.

According to an advantageous embodiment of the method according to the invention, each transducer has a dipole receiving pattern, and the transducers are disposed in a solid medium adjacent the nonsolid medium in a manner such that the receiving patterns of the two transducers are at right angles to one another and the receiving pattern of one transducer extends vertically.

Here the fact is utilized that the wave energy radiated by the sound source in a nonsolid medium is coupled into the adjacent solid medium. The layers, or strata, of the ground near the surface of a depth of about 10 m represent the propagation medium for the wave energy.

Since the solid medium is also able to transmit shear stresses, there occur, in addition to the longitudinal waves existing in the nonsolid medium, transversal waves in which the particles do not oscillate in the direction of propagation but transversely thereto. Moreover, so-called Rayleigh waves also appear at the surface.

The different wave types have respectively different propagation speeds. In the ground, the longitudinal waves propagate at approximately twice the speed of the transversal waves. With the design, arrangement and orientation of the electroacoustic transducers according to the invention, each transducer is associated with one of the sound waves generated on the basis of the coupled-in sound event. The transducer whose receiving direction is oriented essentially in the vertical direction covers the longitudinal waves, the transducer whose receiving direction is oriented at a right angle thereto covers the transversal waves.

The transducers are constructed to have a dipole characteristic, i.e. they have a receiving pattern which is characteristic for dipoles, i.e. a directional pattern in the form of a figure eight. With such a dipole characteristic of the transducers, the receiving direction is understood to be the direction of maximum sensitivity. The orientation of the receiving directions is realized in that the transducers are arranged at right angles to one another and one geophone is oriented vertically.

According to another advantageous embodiment of the method according to the invention, one of the transducers is disposed in the nonsolid medium and has an omnidirectional receiving pattern in at least one plane, and the other of the transducers is disposed in a solid medium adjacent the nonsolid medium and has a dipole receiving pattern. Here again the fact is utilized that the wave energy radiated by the sound source coupled itself into the adjacent solid medium, the ground. The nonsolid medium, such as air or water, here constitutes the one transmission channel and the solid medium, the ground, constitutes the other transmission channel, from the sound source to the sound receiver.

The transmission properties with respect to the speed of sound differ from one channel to the other. The transducer to be disposed in the nonsolid medium will preferably be a microphone having an omnidirectional receiving characteristic and the transducer to be placed in the solid medium will again be a geophone with a dipole characteristic.

According to a further advantageous embodiment of the method according to the invention, each of the transducers has an omnidirectional receiving pattern in at least one plane, one of the transducers is disposed in the nonsolid medium, the other of the transducers is disposed in a second nonsolid medium adjacent the nonsolid medium in which the one transducer is disposed, and the two nonsolid media have respectively different sound wave propagation speeds. Here again, the nonsolid medium, in which the sound source is disposed and which may be air and the nonsolid medium into which the wave energy is coupled, and which may be water, are utilized as the propagation media for the wave energy radiated by the sound source. The fact of the different rates of propagation of sound in water and air is utilized, as in the previously described embodiments, to derive the target data. With this method it is possible, for example, to obtain target data for a low-flying aircraft from a ship.

It is further possible, with the method according to the invention, to utilize layers, or strata, having different sound transmission characteristics in a single medium as the propagation channels for obtaining the target data of a sound source. This would include, for example, sea water having distinct temperature layers. The individual water layers, due to their different temperatures, also have different sound propagation rates. In this case, the target data from a sound source in water could be obtained from a hydrophone in each of two layers having different temperatures and thus different sound propagation rates.

According to an advantageous feature of the method, the two transducers are disposed at a single, spatially defined, stationary measuring station. With this measure there result two advantages. Firstly, the design and placement of the sound receiver is considerably simplified and facilitated. Secondly, due to the relatively short distance between the two electroacoustic transducers, this distance can be neglected in the determination of the target data. In principle, it is of course possible to arrange the electroacoustic transducers at a larger distance from one another, for example at two separate measuring stations. But then the geometric conditions resulting from such an arrangement must be considered in the determination of the target data.

According to a further advantageous implementation of the invention, the sound source is moving along a predetermined path and the measuring station is disposed in the vicinity of the path and at a predetermined lateral spacing therefrom. Because of the short transmission path between the measuring station and a possible location of the sound source, there result favorable conditions with respect to sound propagation and thus good measuring results.

According to a further advantageous manner of carrying out the invention, the two transducers are disposed in the immediate vicinity of the boundary between the nonsolid medium and a second medium adjacent the nonsolid medium. The mechanical vibrations (sound through ground) which are coupled in by the sound source can easily propagate in the layers close to the surface of the solid medium, ground, so that with the arrangement of the transducers according to the invention good results can be expected.

According to another advantageous manner of carrying out the invention, the step of deriving comprises: determining the difference in reception time between the arrival at the two transducers of the respective sound waves to which they respond; providing representations of the propagation speeds of the two sound waves; and combining the propagation speed representations with a representation of the difference in reception time to obtain a representation of the distance of the sound source from the sound receiver. The distance R of the sound source from the measuring station is here calculated from the time difference, $\Delta t$, between signal reception at the two transducers according to the equation $$R = \Delta t \cdot \frac{c_1 \cdot c_2}{c_1 - c_2} \quad (1)$$

where $c_1 > c_2$ and $c_1$ and $c_2$ are the respective propagation speeds of the sound waves detected by the two transducers. In the case of the embodiment of the method in which, as described above, each transducer has a dipole pattern and both transducers are disposed in a solid medium adjacent the nonsolid medium such that the receiving patterns are at right angles to one another and one receiving pattern extends vertically, the respectively different speeds of sound of the types of wave propagating in the ground as covered by the individual transducers must be used in the equation. These speeds of sound are either known or can be determined at the measuring station by a test sound source for which all target data are known. In the previously described embodiments of the method in which one transducer has an omnidirectional receiving pattern in at least one plane and is disposed in the nonsolid medium, and the other transducer either has a dipole receiving pattern and is disposed in a solid medium adjacent the nonsolid medium or has an omnidirectional receiving pattern in at least one plane and is disposed in a second nonsolid medium adjacent, and having a propagation speed different from that of, the first-mentioned nonsolid medium, the respective known propagation speeds in the two adjacent media must be used.

According to another advantageous embodiment of the method according to the invention, the sound source is moving, and the step of deriving comprises: determining the frequencies of the sound waves arriving at the two transducers; providing representations of the propagation speeds of the two sound waves; and effecting a determination, on the basis of representations of the sound wave frequencies and the propagation speed representations, of at least one of: the component of the speed of the sound source in the direction of the receiver, the principal frequency of the sound waves emitted by the source, and the frequency spectrum of the sound waves emitted by the source. The radial speed component $v_r$ of a moving sound source can be calculated according to the equation $$v_r = \frac{c_1 \cdot c_2 (f_1 - f_2)}{f_1 \cdot c_2 - f_2 \cdot c_1} \quad (2)$$

and the frequency $f_o$ of the sound source can be calculated according to the equation $$f_o = f_1 \frac{c_2 \cdot f_2 - c_1 \cdot f_2}{c_2 \cdot f_1 - c_1 \cdot f_2}, \quad (3)$$

where $f_1$ and $f_2$ are the respective Doppler affected frequencies of the received signals at the two transducers, $v_r$ is the radial component of the speed vector of the sound source oriented toward the measuring station, and $c_1$ and $c_2$ are the corresponding speeds of sound in the two media or the propagation speeds of the two wave types in the solid medium, respectively.

Here, $f_o$ is to be understood as being the frequency emitted by a stationary source of sound. If the sound source emits a sinusoidal note of frequency $f_o$, the Doppler-shifted frequencies $f_1$ and $f_2$ are received by the geophones. If the sound source emits a spectrum of frequencies, $f_o$ is a selected frequency of the spectrum, preferably the frequency with the highest level or the greatest amplitude. Of course, it is possible to determine all spectral lines of the sound source's frequency spectrum, but the effort needed for this is considerable, and is also unnecessary. For example, for the classification of the sound source by comparison of its frequency spectrum with a specified, known frequency spectrum, it is sufficient to compare the spectral lines with the largest amplitude in the two spectra.

According to another advantageous embodiment of the method according to the invention, the sound wave to which each transducer responds presents a respective frequency spectrum, and the step of deriving comprises: providing a frequency window having a selected width relative to, and centered on, a center frequency located within each frequency spectrum; and determining the frequency of a spectral line of each spectrum which lies within the frequency window. The frequency $f_o$ and the radial speed component $v_r$ of the sound source are determined by forming the frequency spectra of the received signals of both transducers and determining the frequencies of corresponding spectral lines. Corresponding spectral lines are understood to mean those spectral lines in the frequency spectra of the two received signals which originate from the same spectral frequency of the sound source but are changed by the respective Doppler frequency or frequencies. The determination of corresponding spectral lines is effected in such a manner that a common frequency window is placed over the frequency spectra of the two received signals and this window is displaced successively. The frequency window has a given relative width $\Delta f/f'$ with respect to a center frequency $f'$, which is either estimated or calculated, according to $$\frac{\Delta f}{f} = \frac{f_1 - f_2}{f} \quad (4)$$

$$\frac{f_i}{f} = \frac{1}{1 - \frac{v}{c_i} \cdot \frac{x}{d} \cdot \frac{1}{\sqrt{1 + \left(\frac{x}{d}\right)^2}}}, \quad (5)$$

and i=1 or 2, and wherein the speed of the sound source $c_i$ is again the propagation speed of the sound waves, d is the distance between the sound source and the associated measuring station at the point of greatest proximity to the measuring station, and x is the instantaneous distance of the sound source from that point of greatest proximity. The value of x can be determined from the distance R if the direction of movement of the sound source, e.g. along a road, is known and the distance R is very large compared to distance d. With shorter distances R, a bearing angle from the measuring station to the sound source must also be considered. The speed v of the sound source is assumed to be the maximum possible speed $v_{max}$, depending on which type of moving sound sources are to be detected. The spectral lines are recognized to be corresponding spectral lines whenever their frequency $f_1$ or $f_2$, respectively, lies within the width of the window $\Delta f$, a width which increases with increasing center frequency $f'$. As center frequency $f'$, that frequency is selected which has the greatest amplitude in one of the frequency spectra of the two received signals; this frequency can be determined without difficulty by means of a maximum finder. However, for particular vehicles which are to be detected, this frequency can also be decided beforehand from empirical values.

According to an advantageous embodiment of the method according to the invention, the sound source is moving, one of the transducers has a dipole receiving pattern, the sound receiver further includes a third sound-to-electrical signal transducer having a dipole receiving pattern, the one transducer and the third transducer are disposed in a second medium adjacent the nonsolid medium and are positioned such that their receiving patterns extend perpendicular to one another and lie in a common horizontal plane, the bearing direction of the sound source relative to the receiver is determined on the basis of the output signals produced by the one transducer and the third transducer, and the speed of the sound source is determined on the basis of the bearing direction and the component of the speed of the sound source in the direction of the receiver. The actual speed of the sound source in its direction of travel may be determined by an additional ranging process, which requires merely one further transducer.

The method according to the invention furnishes level and frequency features with which moving sound sources of various types, e.g. wheeled and chain-driven vehicles, can be distinguished and thus classified and identified. To eliminate the influence of the speed of movement on the typical spectrum of the noise source, the last-described embodiment can be advantageously supplemented by standardizing the determined frequency spectrum of the sound source on the basis of the actual speed of the sound source and by using the standardized frequency spectrum for classification and/or identification of the sound source.

According to a further feature of the method according to the invention, wheeled and chain-driven, or tracked, vehicles are distinguished, for example, by examining the frequency spectra for sequences of harmonics. If two distinct harmonics sequences are observed, it can be concluded that chain-driven vehicles are present since with chain-driven vehicles a further distinct harmonics sequence is generated, in addition to the harmonics sequence originating from the engine firing, by the chain links of the vehicle driving chains hitting the ground. To support this distinction, the level of the received signals can be used additionally.

According to an advantageous version of the last-described feature, even different types of chain-driven vehicles can be identified. From the chain link frequency obtained with the method according to the invention, the length of the chain link, which is again typical for a certain chain-driven vehicle, can then be calculated.

According to a further advantageous feature of the method according to the invention, the two transducers are disposed at a single, spatially defined, stationary measuring station, two additional transducers identical to the first and second transducers are provided at a second spatially defined, stationary measuring station disposed at a distance from said first-mentioned station, and the propagation speeds of the sound waves to which said first and second transducers respond are determined on the basis of the frequencies of the sound waves received by the additional transducers. Since particularly in the ground the sound propagation speeds of the various wave types may differ considerably in different regions of the area being monitored due to geologic conditions such as ground consistency, layer formations and the like, it is of advantage to be able to determine also the speeds of sound on the basis of measuring results or to be able to eliminate the unknown speeds of sound in the calculation of the target data.

With a second measuring station which has a known distance from the first measuring station and is of identical construction, it is thus possible to obtain two measuring results over different propagation paths. When a moving sound source is detected, it is possible to determine the frequencies of the received signals from the total of four transducers disposed at the two measuring stations and to determine therefrom, with the aid of the above equations, the speeds of sound $c_1$ and $c_2$, or directly the identifying data.

Under consideration of the equation $$\frac{f_i}{f_o} = \frac{1}{1 - \frac{v_r}{c_i} \cdot \frac{x}{d} \cdot \frac{1}{\sqrt{1 + \left(\frac{x}{d}\right)^2}}} \qquad (6)$$

where $i = 1$ or 2, if the sound source is located far away from the measuring station, i.e. $x/d$ is very large and thus $$\frac{x}{d} \cdot \frac{1}{\sqrt{1 + \left(\frac{x}{d}\right)^2}} \to 1$$

there results a solvable equation system of four equations with four unknowns. With a short distance, however, there results a solvable equation system of six equations with six unknowns.

The individual parameters have the same meaning as in equation (5), with $f_o$ being the frequency radiated by the sound source and $v_r$ the radial speed component of the sound source.

The method according to the invention has the advantage that it is able to detect with a single spatially limited measuring station and with sufficient reliability with respect to distance, position, speed, radiated sound frequency, frequency spectrum and the like, a sound source which is stationary as well as a sound source which moves relative to the measuring station. From the multitide of target data compiled it is then possible to draw conclusions regarding the sound source and thus to classify and identify it. The method according to the invention can be realized with relatively low manufacturing, installation and maintenance costs. The preliminary work required to place the sound receivers is minimal. This assures high mobility.

After placing the sound receivers, the monitoring system operating according to the method of the invention is ready to put into action and is able to operate automatically and for long periods of time. By placing a plurality of measuring stations and providing a central data call-up station, it is possible to monitor in a simple manner an unlimited number of sectors of an area for possibly existing or occurring sound sources and sound events.

With the method according to the invention it is possible, for example, to monitor traffic with respect to occurrence, vehicle density, etc. without requiring complicated preparations. The sound receivers are simply placed at a distance from the road being monitored and/or are buried there. Further preliminary work is not required. Compared to known traffic monitoring methods, complicated road work, such as, for example, installation of inductive conductor loops underneath the roadway or the application of sound barriers, is not required.

With the method according to the invention it is also possible to monitor enemy troop movements behind the lines of combat, particularly on supply lines, and thus obtain valuable data for combat reconnaissance. Since troop movements take place primarily over fortified paths, such as roadways, the sound receivers are preferably placed in the vicinity of the supply roads. The installed sound receivers are difficult to detect and require only small amounts of energy so that they can be used over long periods of time.

The data are transmitted from the measuring stations via a radio link to a central data call-up and information collection station which is protected against enemy fire and where the data are also evaluated.

Not only individual vehicles and vehicle convoys can be detected with the method according to the invention, but the numbers of vehicles and their types can also be determined so that the extent of enemy movement can be determined.

However, with the method according to the invention it is also possible to detect and localize sound and noise sources, such as groups of firing guns or combat tanks, from very great distances and with sufficient accuracy. For example, the distance from a sound source can be determined at two measuring stations and the location of the sound source can be determined according to known geometric, e.g. triangulation, relationships. A single measuring station is sufficient if it also performs a ranging process.

The method according to the invention is also suitable to detect low-flying aircraft, either from land or from water, e.g. from a ship.

The method according to the invention is suitable not only for the detection of sound sources moving on the surface of the earth but also of sound sources movable close to the bottom of the sea and whose noise is coupled into the sea bottom. The preferred use of the method according to the invention is for the protection of shorelines in shallow water regions, e.g. to detect submerged submarines moving in navigation channels, underwater passages and the like.

The present invention will be explained in greater detail with reference to embodiments which are illustrated in the drawings.

DESCRIPTION OF THE PREFERRED EMBODIMENTS

Figure 1A:
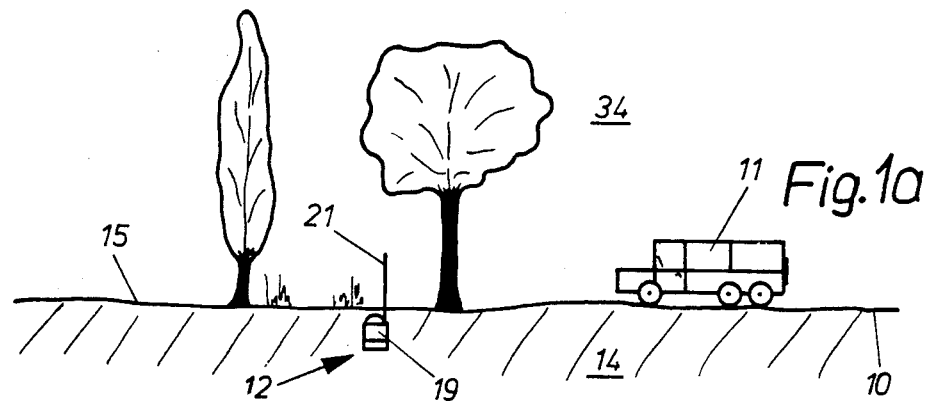
FIGS. 1a and 1b are, respectively, a side elevation and top plan view pictorially showing an arrangement of a measuring station for carrying out the invention in an area being monitored.
Figure 1B:
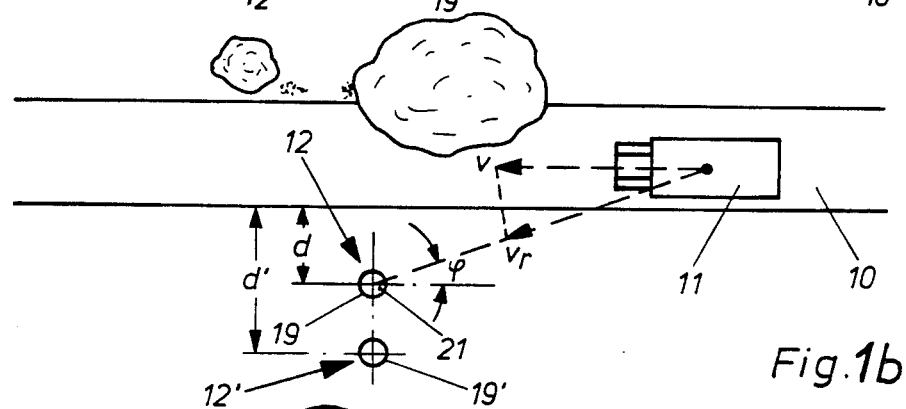

FIGS. 1a and 1b show the spatial relationships established for monitoring a highway 10 according to the invention in order to obtain target data from moving sound sources, here motor vehicles 11. Target data are here understood to means data which indicate the state and/or type of the sound source and which—insofar as they are characteristic for the specific sound source—serve to classify and identify the sound source. Typical such target data are the speed of the sound source, in the direction of movement as well as in the radial direction oriented toward the measuring station, the frequency or frequency spectrum radiated by the sound source, the distance of the sound source from the measuring station—which is of particular interest in surveying essentially stationary sound sources—and possibly the bearing angle from the measuring station to the sound source.

Figure 2:
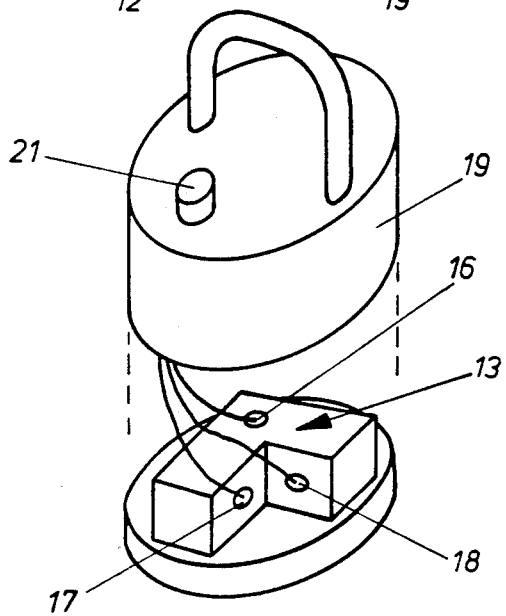
FIG. 2 is a perspective pictorial representation of a sound receiver to be placed at the measuring station of FIGS. 1a and 1b for carrying out the invention.

To derive such data for vehicle 11 moving on highway 10, which vehicle is a sound source moving in the nonsolid medium, air, 34, from a measuring station 12, a sound receiver, shown as element 13 in FIG. 2, which is accommodated in a receptacle 19 is buried in the ground 14 at a lateral distance, d, of, e.g., two to three meters from the highway 10. The depth at which it is buried is slight so that the sound receiver 13 lies close to the surface 15 of the ground.

The sound receiver 13 shown in detail in FIG. 2 includes three electroacoustic, i.e. sound-to-electrical signal, transducers arranged orthogonally to one another, here designed as geophones 16, 17 and 18. Geophones are distinguished in that they have a so-called dipole characteristic, i.e. their directional pattern has the shape of a figure eight. Due to the mutually orthogonal arrangement, the directional patterns of the three geophones 16,17,18 are orthogonal to one another and the direction of maximum sensitivity of the three patterns establishes a spatial coordinate system with the coordinates x, y, z.

The receptacle 19 accommodating geophones 16, 17 and 18 may also accommodate part of the evaluation circuit, shown as system 20 in FIG. 4, and to be described below, for the received signals of geophones 16, 17 and 18. Receptacle 19 is set into the ground 14 at the measuring location 12 in such a manner that geophone 16 is oriented to have an about vertical pattern. Geophones 17 and 18 are then oriented to have patterns which are horizontal and at right angles to one another.

Via an antenna 21 which projects above ground surface 15, intermediate values which can be derived from the received signals of geophones 16, 17 and 18 for determining the target data, or the target data themselves, can be transmitted by radio to a call-up station not shown in detail.

As soon as the vehicle 11 traveling on the highway 10 has reached the receiving range of the sound receiver 13, geophones 16, 17 and 18 receive signals. The evaluation circuit 20 now determines, on the one hand, the frequencies of the received signals of geophones 16 and 17 and derives therefrom, in a manner to be described below, the speed and sound radiation frequency of the vehicle 11. On the other hand, the time difference between signal reception at geophones 16 and 17 is measured and the distance of vehicle 11 from measuring station 12 is determined therefrom. The third geophone 18 in conjunction with geophone 17 placed at a right angle thereto in the same horizontal plane, serves to find the bearing of the momentary location of vehicle 11.

Figure 4:
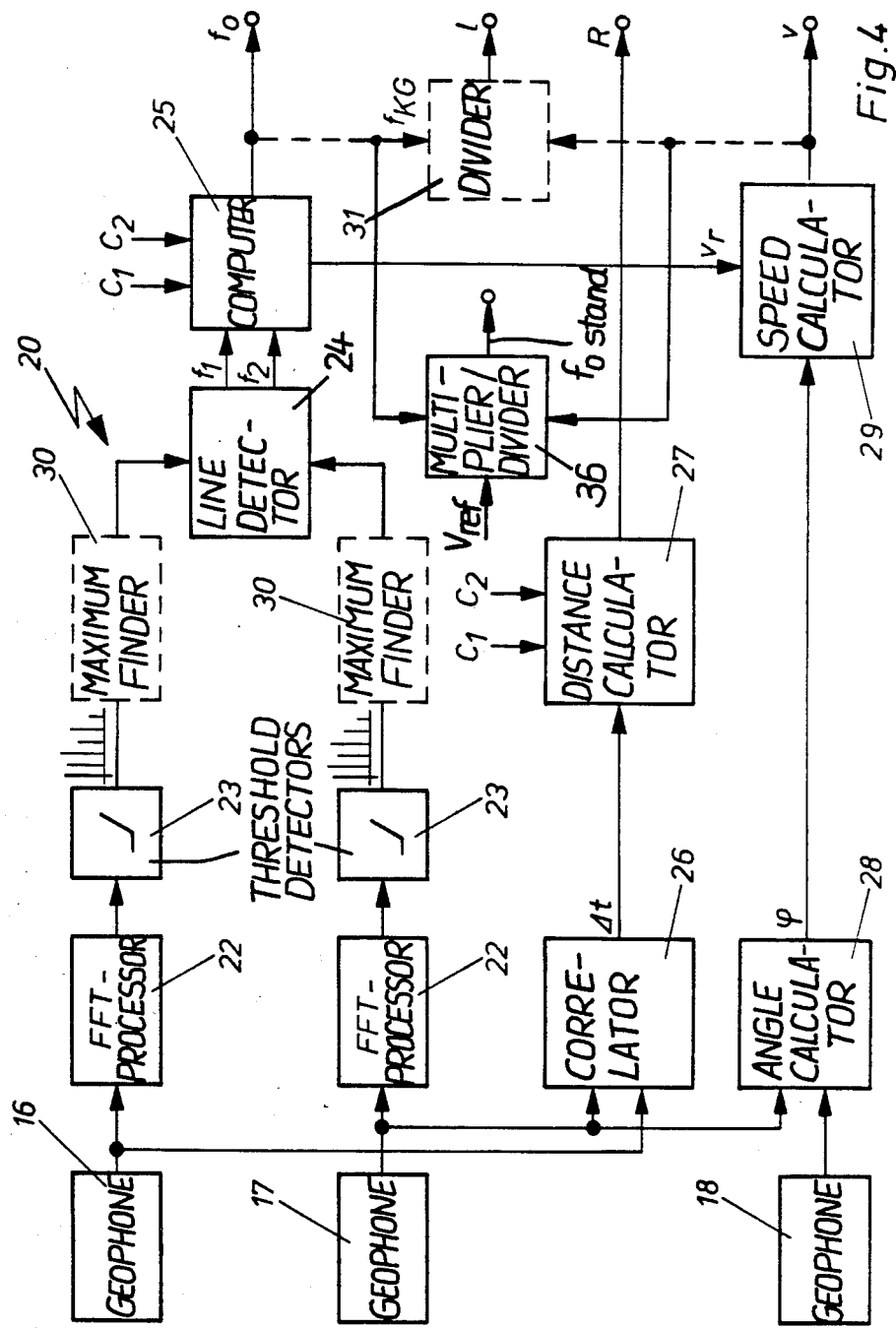
FIG. 4 is a block circuit diagram of an evaluation circuit for evaluating signals received by the sound receiver according to the invention.

One preferred form of evaluation circuit 20 is shown schematically in FIG. 4. The outputs of geophones 16 and 17 are connected—possibly via amplifiers—with respective FFT (fast Fourier transformation) processors 22. The frequency spectra of the received signals obtained at the outputs of the FFT processors 22 are fed to a line detector 24 with window function, each spectrum being conducted through a respective threshold detector 23 which suppresses ground noise.

The line detector 24 continuously compares spectral lines of the one received signal with spectral lines of the other received signal which correspond with respect to their frequencies and the frequencies of associated spectral lines are put out separately.

The comparison criterion is furnished by the window function of the line detector 24. To do this, a window having a given freqency width obtained from the maximum given vehicle speed is moved across the frequency spectra and spectral lines are considered to be associated if the respective spectral lines in both frequency spectra line within the frequency window.

As mentioned at the beginning, for detection and classification purposes it is usually sufficient to know only the frequency with the greatest amplitude in the frequency spectrum of the sound source. In this case, a window of width $$\Delta f = \frac{\Delta f}{f'} \cdot f'$$

is set up around the spectral lines f' with the greatest amplitude in one of the two frequency-spectra of the received signal of geophones 16, 17. A check is then carried out in the frequency spectrum of the received signal of the other geophone, 17 or 16, to see whether the spectral line with the greatest amplitude lies in the frequency band defined by the position of the window. If so, these two frequencies correspond, i.e. they come from the same source of sound and are output as frequencies $f_1$ and $f_2$. This checking process is usually carried out in the line detector 24 by means of a computer program.

The width $\Delta f$ of the frequency window is frequency dependent. Its relative width $\Delta f/f'$ with respect to the center frequency f' is estimated for an assumed maximum travel speed $v_{max}$ of the vehicles 11 to be detected or is calculated more accurately according to the following equation $$\frac{\Delta f}{f} = \frac{f_1 - f_2}{f}, \quad (4)$$

with $$\frac{f_i}{f} = \frac{1}{1 - \frac{v_{max}}{c_i} \cdot \frac{x}{d} \cdot \frac{1}{\sqrt{1 + \left(\frac{x}{d}\right)^2}}}. \quad (5)$$

where i=1 or 2, d is the distance of the measuring station 12 from the point on the vehicle path where vehicle 11 is closest to the measuring station (FIG. 1), i.e. the length of the line between station 12 and the line of travel of vehicle 11 and perpendicular to that line of travel, x is the distance of the vehicle 11 from this closest point at the moment of signal detection, and $c_i$ is the signal propagation speed which will be explained below.

For values of $c_1$=300 m/s, $c_2$=90 m/s, x/d=6 and $v_{max}$=40 km/h, there results a relative window width Δf/f′=0.13. With a center frequency f′ of, e.g., 100 Hz, spectral lines would be considered to correspond, and their frequencies $f_1$, $f_2$ fed to the output of line detector 24, only if they lie between 93.5 and 106.5 Hz. In this example, vehicles 11 are detected correctly only if they do not travel substantially faster than 40 km/h.

The distance x can be calculated from the distance R between measuring station 12 and vehicle 11 at the moment of signal reception, which will be calculated as described below, and from the bearing angle $\phi$ between measuring station 12 and vehicle 11 at the time of signal reception, which is likewise obtained as described below. With large distances R, the bearing angle can remain unconsidered in a first approximation.

Frequencies $f_1$ and $f_2$ put out at the outputs of line detector 24 for corresponding spectral lines are fed to a computer 25. The computer 25 calculates from frequencies $f_1$ and $f_2$ the radial component of the vehicle speed $v_r$, i.e. the component oriented toward the measuring station 12, and the frequency $f_o$ radiated by the vehicle according to the following equations $$v_r = \frac{c_1 \cdot c_2 \cdot (f_1 - f_2)}{f_1 \cdot c_2 - f_2 \cdot c_1} \quad (2)$$

$$f_o = f_1 \frac{c_2 \cdot f_2 - c_1 \cdot f_2}{c_2 \cdot f_1 - c_1 \cdot f_2} . \quad (3)$$

The propagation speed $c_1$ of longitudinal waves and the propagation speed $c_2$ of transverse waves through the ground are known and can be determined, if necessary, at the location of measuring station 12 by means of a test sound source. These values are fed into computer 25 as constants, as indicated in FIG. 4.

To measure the time difference between signal reception at the two geophones 16 and 17, the latter are connected with a correlator 26. The correlator 26 determines in a known manner the time difference Δt between the received signals produced due to different propagation speeds and feeds a representation of this difference to a distance calculator 27. The distance calculator 27 calculates the distance R of the vehicle 11 from the measuring station 12 by means of the following equation:

$$R = \Delta t \cdot \frac{c_1 \cdot c_2}{c_1 - c_2} \quad (1)$$

wherein $c_1$ and $c_2$ are again the propagation speeds of longitudinal and transverse waves in the ground 14, which are fed into distance calculator 27 as constants.

The outputs of geophones 17 and 18 are connected to inputs of an angle calculator 28 which calculates from the amplitudes of the received signals of the two geophones 17 and 18, which are both disposed in the horizontal plane and are oriented at right angles to one another, the bearing angle $\phi$ in a coordinate system given by the orientation of geophones 17 and 18 according to the following equation:

$$\phi = \arctan \frac{A_1}{A_2} \quad (7)$$

By appropriately aligning the sound receiver 13, the coordinate system is selected so that the coordinates are oriented perpendicular and parallel, respectively, to highway 10. $A_1$ and $A_2$ are here the respective average values of the signal amplitudes.

The $v_r$ output of computer 25 and the output of angle calculator 28 are connected to inputs of a speed calculator 29 which calculates, from the angle value $\phi$ supplied to it and the radial component of the vehicle speed $v_r$ supplied to it, the vehicle speed in the forward direction according to $$v = \frac{v_r}{\cos \phi} \quad (8)$$

At the output of the speed calculator 29 there can be obtained a representation of the actual vehicle speed v. The vehicle speed can now be utilized to standardize the frequency spectrum radiated by the vehicle 11 and obtainable at the output of computer 25, so that the very dispersive influence of the respective vehicle speed of vehicle 11 on the spectrum can be eliminated. The thus standardized frequency spectrum, when compared with known frequency spectra stored as samples, will permit a conclusion as to the type of vehicle involved. For this purpose, a multiplier/divider 36 is provided, as shown in FIG. 4. This multiplier/divider is connected to the output of the computer 25 on the one hand, and to the output of the speed calculator 29 on the other hand. Via a further input, a reference speed $v_{ref}$ is input to the multiplier/divider 36. The multiplier/divider 36 now calculates the standardized frequency $f_{ostand}$ from the sound source frequency $f_o$ which has been determined, e.g. the frequency $f_o$ with the greatest amplitude, according to the following formula:

$$f_{ostand} = f_o \frac{v_{ref}}{v} . \quad (9)$$

Of course, this calculation can be carried out for all of the sound source's spectral lines $f_o$ that may be determined, but for the specified classification purpose it is sufficient to calculate the standardized frequency $f_o$ with the greatest amplitude.

Chain-driven vehicles can be identified by employing the additional component groups shown in broken lines in FIG. 4. The spectrum of chain-driven vehicles is characterized by a harmonics sequence having very distinct spectral lines of large amplitude. These harmonics sequences are caused by the rhythmic hitting of the links of the chains on the ground. The amplitudes of these harmonics sequences are substantially greater than, for example, the amplitudes of a harmonics sequence caused by the firing sequence of an engine and also contained in the frequency spectrum of wheeled vehicles.

For the identification of chain-driven vehicles on the basis of the so-called chain link frequency $f_{KG}$ generated by them, a respective maximum finder 30 is connected between each of threshold detectors 23 and its associated line detector 24 to eliminate the spectral lines at the greatest amplitude.

This maximum searcher furnishes computer 25 with frequencies $f_1$ and $f_2$ which correspond to the respective Doppler-affected first harmonic of the chain link frequency $f_{KG}$. In this case, the chain link frequency $f_{KG}$ is put out at the output of computer 25. This chain link frequency $f_{KG}$ and the speed v obtained at the output of speed calculator 29 are fed to a divider 31 at whose output the chain link length l can be obtained as the quotient of speed v and chain link frequency $f_{KG}$. The chain link length is characteristic for various types of chain-driven vehicles so that the chain-driven vehicle detected by measuring station 12 can be identified with the aid of the chain link length l.

Figure 3:
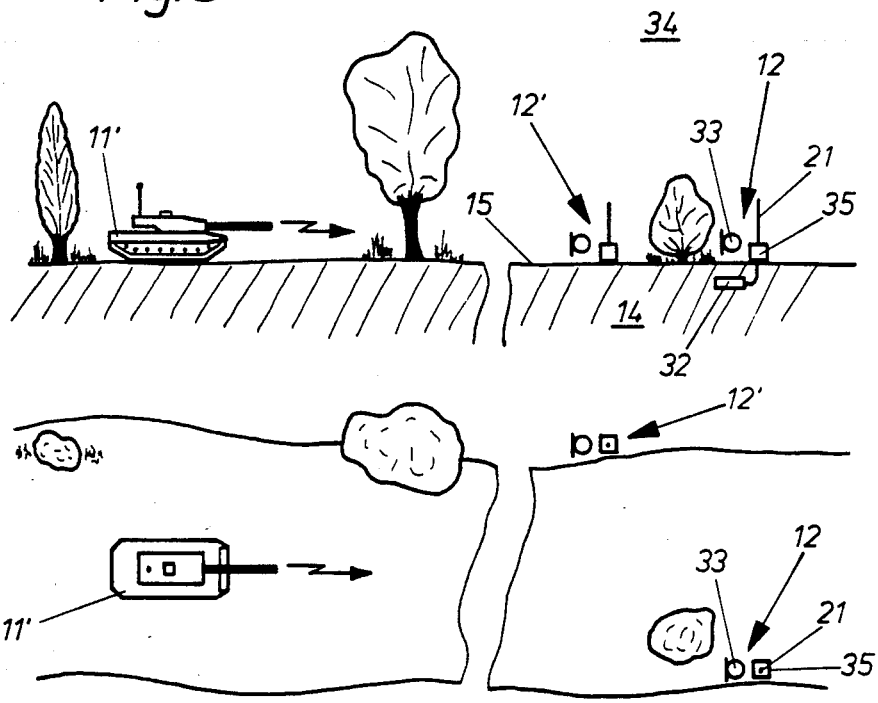
FIGS. 3a and 3b are views similar to those of FIG. 1 of a further embodiment of the arrangement of a measuring station for carrying out the invention in a monitoring area as in FIG. 1.

Referring to FIG. 3, the above-described method can be practiced, with the apparatus required to implement this method, with an electroacoustic transducer with dipole characteristic, here likewise a geophone 32, and an electroacoustic transducer 33 with an omnidirectional characteristic, here constituted by a microphone, provided at the measuring station 12 instead of the sound receiver 13 of FIG. 2 which is buried in the ground 14. While the geophone 32 is again buried slightly below the surface 15 of the ground 14, in this case in any desired orientation, microphone 33 is placed slightly above surface 15 so that the two transducers 32 and 33 are disposed in respectively different media, on the one hand transducer 32 being in the solid medium, earth, 14, and on the other hand transducer 33 being in the nonsolid medium, air, 34. The evaluation circuit 20 is accommodated completely or partly, in a housing 35 and the target data or intermediate values thereof, respectively. are transmitted via antenna 21.

If, in the present case, the location of the sound source is to be determined by additional ranging, it is necessary, as already described, to again provide the further geophone 18 which is then arranged so that its directional pattern is in the same horizontal plane as geophone 32 and is at a right angle thereto.

Evaluation circuit 20 remains unchanged. Its one input must be connected to microphone 33 instead of with geophone 16 and the other input must be connected with geophone 32 instead of with geophone 17.

As shown schematically in FIGS. 3a and 3b, the location of a sound source, e.g. the firing of a weapon from a tank 11', can be determined with the aid of the above-described method by measuring its distance from two measuring stations 12 and 12' arranged at a distance from one another. This may be done with the arrangement shown in FIGS. 3a and 3b and including a geophone 32 as well as a microphone 33 or with the arrangement shown in FIGS. 1 and 2 including the sound receiver 13 with geophones 16 and 17. Each measuring station 12 and 12' determines the distance R from the sound source of the sound event. With the position of measuring stations 12 and 12' known, it is then possible to determine the location of the sound source according to simple geometric relationships.

When two transducers are used which are arranged in different media, i.e. ground 14 and air 34, such as microphone 33 and geophone 32 in FIG. 3, the speeds of sound in the two media, air 34 and ground 14, must be fed as known values into computer 25 and distance calculator 27. The respective values $c_1$ and $c_2$ in the above equations then correspond to the respective values of the speed of sound in air and in the ground. The respective speeds of sound can here again be determined empirically with the use of a test sound source disposed at a known position.

Since particularly the propagation speeds of the various wave types in the ground may differ considerably due to geologic conditions and the empiric determination by means of test sound sources sometimes takes too much time, the propagation speeds of the detected sound waves can also be determined in a different way. For this purpose, as shown schematically in FIG. 1, a further measuring station 12' is provided at a known distance from the first measuring station 12. The design and arrangement of the sound recorders in both measuring stations 12 and 12' is identical.

The frequencies $f_1$ and $f_2$ of received signals are determined at both measuring stations 12 and 12'. These frequencies differ from one another due to the different locations of measuring stations 12 and 12' and thus due to the different Doppler frequencies of their received signals. Under consideration of the frequencies $f_1$ and $f_2$ determined at measuring station 12 and the frequencies $f_1'$ and $f_2'$ determined at measuring station 12', the above equations (1)–(3) and (7) and (8) for the target data of the sound source and the following equation $$\frac{f_i}{f_o} = \frac{1}{1 - \frac{v_r}{c_i} \cdot \frac{x}{d} \cdot \frac{1}{\sqrt{1 + \left(\frac{x}{d}\right)^2}}} \qquad (6)$$

then provide a solvable equation system of six equations and six unknowns, where $v_r$ and $v_r'$ are the radial components oriented toward the measuring stations 12 and 12', respectively, for the speed of the vehicle 11; d and d' are the distances of the measuring stations from the closest point of approach (CPA) of vehicle 11 to measuring stations 12 and 12', respectively; x and x' are the instantaneous distances of the vehicle 11 from the respective CPA point. While x and x' are equal in FIG. 1b, they can also be unequal, as is the case in FIG. 3b.

If the distance x or x' of the vehicle 11 from measuring station 12 or 12', respectively, is very much larger than the distance d or d' from the CPA point, the term $$\frac{x}{d} \cdot \frac{1}{\sqrt{1 + \left(\frac{x}{d}\right)^2}}$$

goes toward 1 and a solvable equation system of four equations with four unknowns is obtained. In both cases, the unknown values of the propagation of the detected sound waves can be calculated or they can be eliminated from the direct calculation of the target data.

The present invention is not limited to the above-described embodiments. For example, sound receiver 13 may also comprise a microphone and a hydrophone, with the hydrophone being disposed in water and the microphone in air. Both electroacoustical transducers have an omnidirectional receiving pattern. When the method is carried out with this apparatus, it is possible to obtain, for example, the target data of a low-flying aircraft from a ship. The evaluation circuit is identical to the evaluation circuit described in connection with FIG. 4. Only geophone 16 is replaced by a microphone and geophones 17 and 18 are replaced by hydrophones or vice versa. Sound receiver 13 may also include two hydrophones which are disposed in the water in layers having distinctly different temperatures. Due to the different temperatures, these layers have different sound propagation speeds. Evaluation circuit 20 then need be modified compared to that shown in FIG. 4 only to the extent that all geophones 16 to 18 are replaced by hydrophones.

The sound receiver may also include two microphones, which are disposed in layers of air having different sound transmission characteristics. Geophones 16 to 18 of evaluation circuit 20 must then be replaced by microphones. Suitable embodiments of the FFT processor 22, of the threshold detectors 23 and of the maximum finders 30 are known and are described in the U.S. Pat. No. 4,271,412, for example. There, a suitable FFT processor is designated as an FFT transformer (66) and is described in column 4, lines 52 to 61. It is understood that the output signals of the geophones 16, 17—and also of the geophone 18—are provided in digital form, so that each geophone 17, 18 has to include an analog-to-digital converter which is identical to the analog-to-digital converter (64) in the above-mentioned U.S. patent.

A suitable threshold detector is described as the threshold unit (90) in column 7, lines 35 to 46 of the above U.S. patent.

A suitable maximum finder is described in column 8, lines 43 to 59 of the above U.S. patent, and consists of the gate (110), the comparator (114) and the two registers (117) and (118). In the present case, the magnitude of each spectral line and the associated frequencies are applied to the two inputs of the gate. The two registers store both the magnitude and the associated frequency of the largest spectral line.

Figure 5:
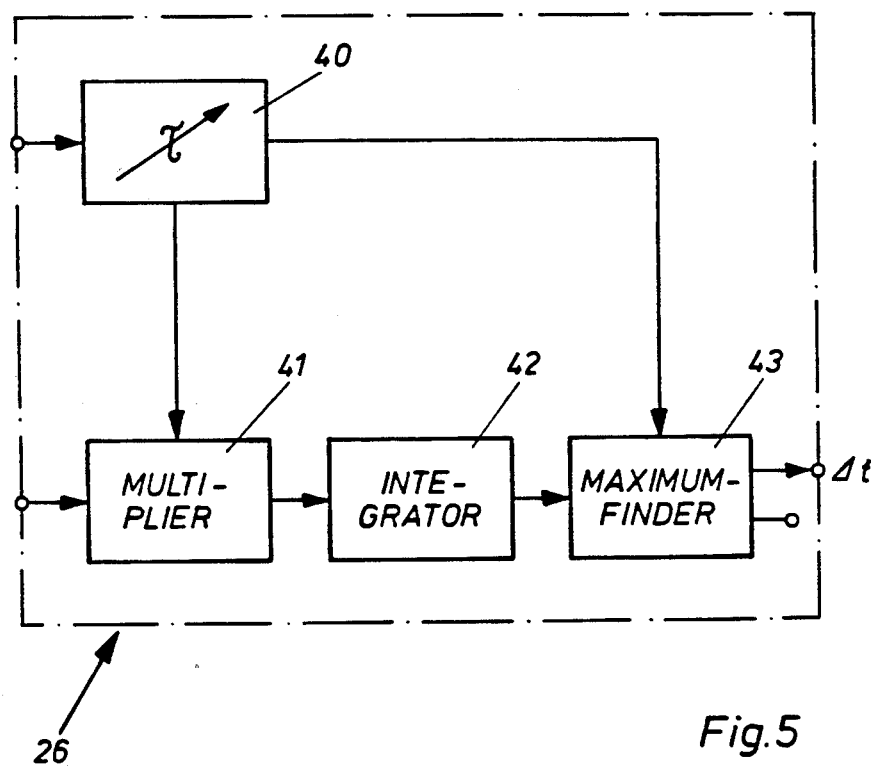
FIG. 5 is a block circuit diagram of an embodiment of a correlator used in FIG. 4.

One embodiment of the familiar correlator 26 is shown in FIG. 5. Its two inputs are fed with the received signals of the geophones 16, 17. In the correlator 26, the signals of geophone 17 are input directly to a multiplier 41, and the signals of geophone 16 are input to the multiplier 41 via a delay element 40 with an adjustable delay time $\tau$. The output of the multiplier 41 is connected to an integrator 42. The outputs of the delay element 40 and integrator 42 are connected to a maximum finder 43 of the type mentioned above. By successive changing of the delay time $\tau$ in the delay element 40, the received signals of the geophones 16, 17 are displaced from one another in time more and more until their product is a maximum, i.e. until the difference in travelling times between the received signals is zero. In its registers, the maximum finder 43 stores both the magnitude of the product and the corresponding delay time $\tau$ which is set in the delay element. The delay time $\tau$ corresponding to the product maximum is output as the travelling time difference $\Delta t$ at the output of the correlator 26.

Figure 6:
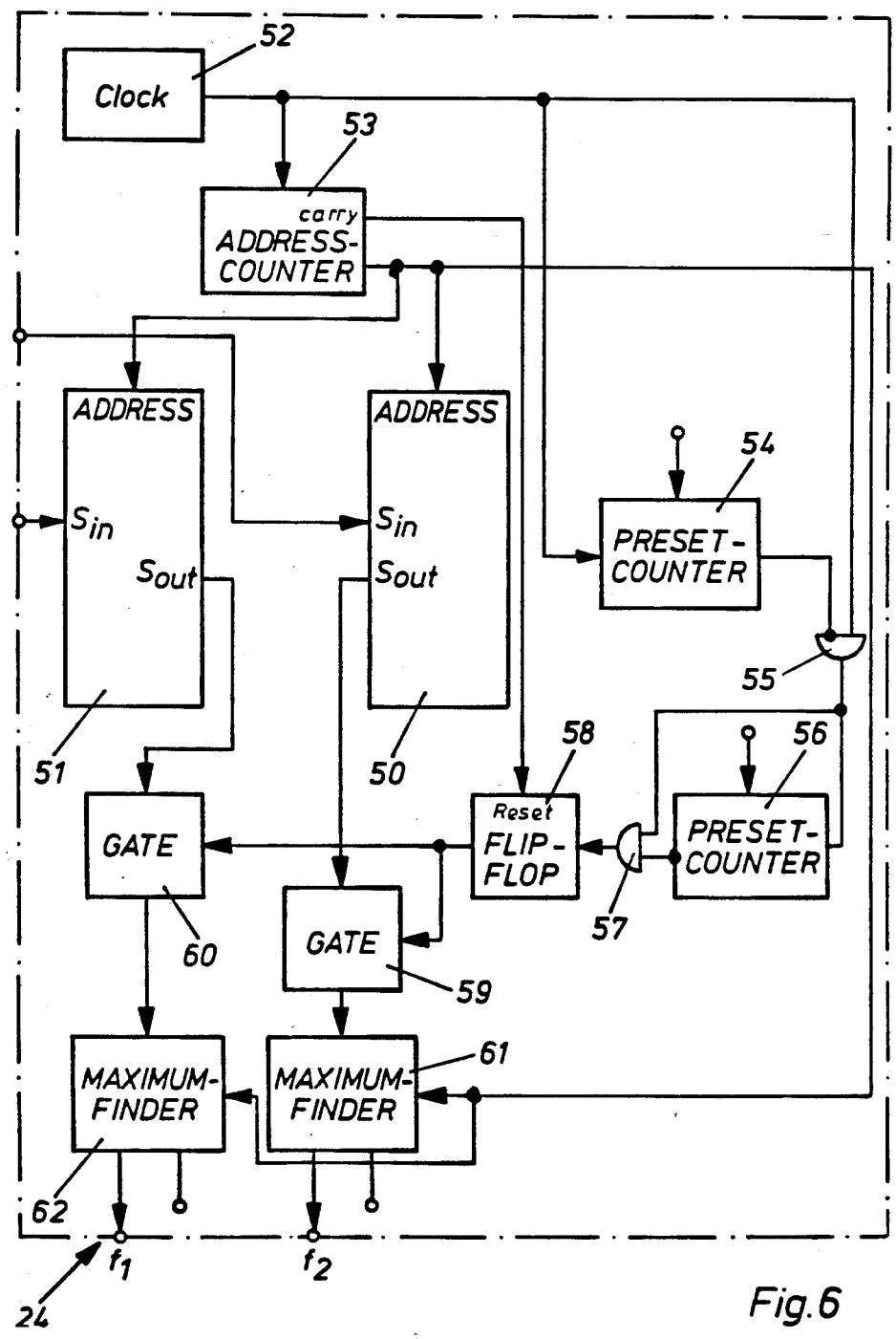
FIG. 6 is a block circuit diagram of a schematic embodiment of a line detector used in FIG. 4.

As already mentioned, the function of the line detector 24 is usually realised by a computer on a software basis. However, it is also possible to specify the line detector 24 in the form of hardware. One embodiment which is possible in principle is shown schematically in FIG. 6.

In two one-dimensional RAM's 50, 51, the amplitudes of the spectral lines of the frequency spectra of the received signals of both geophones 16, 17 are written separately. Each memory location of the two memories 50, 51 can be addressed by the counter status of an addres counter 53. The respective counter status corresponds to a particular frequency. The counting pulses are generated by a clock generator 52. The window width $\Delta f$ is set by the presetting of a preset counter 56. The position of the window within the frequency band is specified by the presetting of a further preset counter 54.

The outputs of the RAM's 50, 51 are connected via a gate, 59/60, to one maximum finder each, 61/62, of the type previously mentioned. The two gates 59, 60 are controlled by a flip-flop 58; the reset input of this flip-flop is connected to the carry output of the address counter 53, and its set input is connected to the output of an AND gate 57. One input of the AND gate 57 is connected to the counting output of the preset counter 56 and the other input is connected to the output of a second AND gate 55, which in turn is connected to the counting input of the preset counter 56. One input of the second AND gate 55 is connected to the output of the clock generator 52, and another, negated input is connected to the counting output of the preset counter 54, which in turn is clocked by the clock generator 52. The output of the address counter 53 is connected to each of the maximum finders 61 and 62.

During read-out of the two memories 50, 51, the amplitudes and the associated frequencies corresponding to the respective counter-status of the address counter 53 are fed to the maximum finders 61, 62 if——and only if——the gates 59, 60 are open. This is always the case as soon as the preset counter 54 has counted from its preset counter-status to zero and as long as the preset counter 56 is counting from its preset value to the counter-status "zero". The two maximum finders 61, 62 find the maximum amplitudes of the readout spectral lines from each section of the two frequency-spectra that is defined by the frequency window $\Delta f$. The two maximum finders 61, 62 then output the frequencies $f_1$ and $f_2$ which correspond to the maximum amplitudes.

It will be understood that the above description of the present invention is susceptible to various modifications, changes and adaptations, and the same are intended to be comprehended within the meaning and range of equivalents of the appended claims.

What is claimed is:

1. A passive method for obtaining target data from a sound source moving along a predetermined path in a nonsolid medium, comprising:
    disposing two sound-to-electrical signal transducers at a single, spatially defined, stationary measuring station which is remote from the sound source and which is in the vicinity of, and at a predetermined lateral spacing from, the predetermined path, and positioning the transducers to each respond to a respective one of two sound waves propagated from the sound source to the measuring station at respectively different propagation speeds;
    producing representations of the frequency spectra of the sound waves arriving at the two transducers;
    providing representations of the propagation speeds of the two sound waves;
    determining, on the basis of the representations of the frequency spectra produced and the representations of the propagation speeds provided, the frequency spectrum of the sound waves emitted by the source and the component of the speed of the sound source in the direction of the station;
    determining the speed of the sound source along the predetermined path;
    standardizing the frequency spectrum representation on the basis of the speed of the sound source along the predetermined path; and
    determining a characteristic of the sound source directly from the standardized frequency spectrum representation.

2. Method as defined in claim 1 wherein each said transducer has a dipole receiving pattern, and said transducers are disposed in a solid medium adjacent the nonsolid medium in a manner such that the receiving patterns of said two transducers are at right angles to one another and the receiving pattern of one said transducer extends vertically.

3. Method as defined in claim 1 wherein one of said transducers is disposed in the nonsolid medium and has an omnidirectional receiving pattern in at least one plane, and the other of said transducers is disposed in a solid medium adjacent the nonsolid medium and has a dipole receiving pattern.

4. Method as defined in claim 3 wherein said one transducer is a microphone and said other transducer is a geophone.

5. Method as defined in claim 1 wherein said step of determining the speed of the sound source along the predetermined path comprises: determining the bearing direction of the sound source relative to the station; and determining the speed of the sound source based on the bearing direction and the component of the speed of the sound source in the direction of said receiver.

6. Method as defined in claim 1 wherein said step of providing further comprises providing two additional transducers indentical to said two first-recited transducers at a second spatially defined, stationary measuring station disposed at a distance from said first-recited station; and further comprising determining the propagation speeds of the sound waves to which said first and second transducers respond on the basis of the frequencies of the frequency spectra of the sound waves received by said additional transducers.

7. Method as defined in claim 2 wherein the dipole receiving pattern of one of said two transducers lies in a horizontal plane, and further comprising: disposing, in the solid medium which is adjacent the nonsolid medium, a third sound-to-electrical signal transducer having a dipole receiving pattern such that the dipole receiving pattern of the third transducer lies in a horizontal plane and extends perpendicular to the receiving pattern of the one transducer; and determining the bearing direction of the sound source relative to the station on the basis of the output signals produced by the one transducer and the third transducer.

8. Method as defined in claim 7 wherein the one transducer and the third transducer are both geophones.

9. Method as defined in claim 1 wherein the sound source is a land vehicle, said step of determining the frequency spectrum of the sound wave emitted by the source comprises determining the frequency of the corresponding spectral lines of the frequency spectra received by the two transducers which have the highest amplitude, and said step of determining a characteristic of the sound source comprises: determining if the frequency spectrum of the sound wave received by each dipole transducer has two distinct harmonic sequences, indicating that the sound source is a tracked vehicle; deriving a representation of chain link frequency based on the frequencies of the corresponding spectral lines which have the highest amplitude; and deriving a representation of the length of each link of a tracked vehicle by dividing the speed of the vehicle by the chain link frequency, so that the representation of the length of each link providing an identification of the nature of the vehicle.

10. Method as defined in claim 1 wherein said step of determining the frequency spectrum of the sound source comprises:

providing a frequency window having a selected width relative to, and centered on, a center frequency located within the frequency spectrum of the sound waves arriving at each transducer;

determining the frequency of a spectral line of each spectrum which lies within the frequency window; and determining an associated spectral line frequency of the sound source frequency spectrum according to the equation:

$$f_o = f_1 \cdot \frac{C_2 \cdot f_2 - C_1 \cdot f_2}{C_2 \cdot f_1 - C_1 \cdot f_2}$$

where: $f_o$ is the associated spectral line frequency of the sound source frequency spectrum;

$f_1$ and $f_2$ are the frequencies of the spectral lines of the spectra of the sound waves arriving at each respective transducer; and $C_1$ and $C_2$ are the propagation speeds of the sound waves to which the respective transducers respond.

* * * * *